US008886733B2

(12) United States Patent
Jeon et al.

(10) Patent No.: US 8,886,733 B2
(45) Date of Patent: Nov. 11, 2014

(54) VESSEL AND LAND MESSENGER SERVICE APPARATUS AND METHOD USING VESSEL MAINTENANCE SERVICE

(75) Inventors: Hae Sook Jeon, Daejeon (KR); Kwangil Lee, Daejeon (KR); Jun Hee Park, Daejeon (KR); Kyeong Deok Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 397 days.

(21) Appl. No.: 13/336,768

(22) Filed: Dec. 23, 2011

(65) Prior Publication Data

US 2012/0166559 A1    Jun. 28, 2012

(30) Foreign Application Priority Data

Dec. 23, 2010   (KR) .................. 10-2010-0133407

(51) Int. Cl.
*G06F 15/16* (2006.01)
*H04L 12/58* (2006.01)

(52) U.S. Cl.
CPC ............... *H04L 51/066* (2013.01); *H04L 51/38* (2013.01)
USPC ............................ 709/206; 709/204; 709/205

(58) Field of Classification Search
CPC ...................................................... H04L 51/046
USPC .................. 709/202–207; 455/412.1–412.2
See application file for complete search history.

(56) References Cited

U.S. PATENT DOCUMENTS

| 7,047,114 | B1* | 5/2006 | Rogers ............................. 701/21 |
| 8,086,408 | B1* | 12/2011 | Majzlik et al. .................. 702/11 |
| 2002/0035597 | A1* | 3/2002 | Khodko et al. ................ 709/203 |
| 2006/0095244 | A1* | 5/2006 | Messick .......................... 703/21 |
| 2008/0172327 | A1* | 7/2008 | Bohonnon ....................... 705/39 |
| 2009/0144039 | A1* | 6/2009 | Thorsteinsson ................... 703/6 |
| 2009/0191905 | A1 | 7/2009 | Wu et al. |

FOREIGN PATENT DOCUMENTS

| EP | 1 841 094 A2 | 10/2007 |
| KR | 2009-0001748 A | 1/2009 |
| KR | 2010-0042163 A | 4/2010 |

* cited by examiner

*Primary Examiner* — Bharat N Barot
(74) *Attorney, Agent, or Firm* — Rabin & Berdo, P.C.

(57) ABSTRACT

A vessel messenger service apparatus includes: a vessel messenger service unit for providing messenger service between vessel, converting a local message from a vessel client into a global message to be transmitted to a land client, converting a message generated from the land client into a local message and providing the converted local message to the vessel client; and a vessel maintenance service unit for providing a remote vessel maintenance service and a messenger service between the vessel client and the land client by interworking with a unified vessel maintenance service unit on land. The apparatus further includes a database managing unit for managing information for the vessel client and the land client.

20 Claims, 2 Drawing Sheets

VESSEL AND LAND MESSENGER SERVICE APPARATUS AND METHOD USING VESSEL MAINTENANCE SERVICE

CROSS-REFERENCE(S) TO RELATED APPLICATION(S)

The present invention claims priority of Korean Patent Application No. 10-2010-0133407, filed on Dec. 23, 2010, which is incorporated herein by reference.

FIELD OF THE INVENTION

The present invention relates to a messenger service relating to vessel maintenance; and more particularly, to a vessel and a land messenger service apparatus and a method using maintenance service capable of providing messenger service based on a system providing service relating to the vessel maintenance by performing communication between the vessel and the land.

BACKGROUND OF THE INVENTION

According to the progress of network, messenger program for sending simple text only is popular with E-mail in order for communication between remote places. It can be checked by the messenger program whether he or she logs on or logs off. In addition, real time chatting can be possible by the messenger program. Thus, the messenger program is used widely in a communication service using an internet Currently, the messenger program provides various functions such as URL transmission, group chatting, file transmission or the like in addition to simple text transmission. In addition, the messenger program provides additional information such as stock, traffic and weather and the like, or additional service such as a game, wired/wireless interworking service, voice chatting and video chatting. Thus, various functions can be integrated into the messenger program and various functions can be provided by the messenger program.

Meanwhile, a vessel maintenance system is developed recently. The vessel maintenance system can provide vessel maintenance service by performing communication between a vessel and land with wireless network. Conventional remote vessel maintenance system collects data from the vessel, transmits the data to a server in land and constructs database by using the transmitted data and performs analysis.

However, although communication is required between users of the vessel and land in order to use the vessel maintenance system, such communication tool has not been developed.

SUMMARY OF THE INVENTION

In view of the above, the present invention provides a messenger service by which instant response can be performed for efficiency of users by using a system for performing control, monitoring and maintenance of an apparatus in a vessel from remote place.

The present invention is not limited thereto, and all other objects that are not described above will be apparently understood by those skilled in the art from the following description.

In accordance with a first aspect of the present invention, there is provided a vessel messenger service apparatus using vessel maintenance service. The vessel messenger service apparatus includes: a vessel messenger service unit for providing messenger service between vessel clients by using a local message generated from the vessel clients, converting the local message into a global message to be provided to a land client via a messenger service between the vessel client and the land client, converting a message generated from the land client into a local message and providing the converted local message to the vessel client; a vessel maintenance service unit for providing the messenger service between the vessel client and the land client and a remote vessel maintenance service by interworking with a unified vessel maintenance service unit on land; and a vessel database managing unit for managing information for the vessel client and the land client.

In accordance with a second aspect of the present invention, there is provided a land messenger service apparatus using vessel maintenance service. The land messenger service apparatus includes: a land messenger service unit for providing a messenger service between land clients by using a local message generated from the land clients, converting a local message generated from the land client into a global message to be provided to a vessel client via a messenger service between the vessel client and the land client, converting a message generated from the vessel client into a local message and providing the converted local message to the land client; a unified vessel maintenance unit for providing the messenger service between the vessel client and the land client and a remote vessel maintenance service by interworking with a vessel maintenance service unit; and a unified database managing unit for managing information for the vessel client and the land client.

In accordance with a third aspect of the present invention, there is provided a method for providing a messenger service by using a vessel maintenance service unit interworking with a unified vessel maintenance service unit via a unified gateway. The method includes: performing a login process for a first vessel client when a messenger service request is received from the first vessel client; providing a messenger service between the first vessel client and a second vessel client; converting a message generated from the first vessel client into a global message when the first vessel client requests a communication with a land client and providing the land client with the global message via the unified vessel maintenance service unit; receiving a message generated from the land client via the unified vessel maintenance service unit and the vessel maintenance service unit; and converting the received message into a local message and providing the first vessel client with the local message.

In accordance with a fourth aspect of the present invention, there is provided a method for providing a messenger service by using a unified vessel maintenance service unit on land interworking with a vessel maintenance service unit via a unified gateway. The method includes: performing a login process for a first land client when a messenger service request is received from the first land client; providing a messenger service between the first land client and a second land client; converting a message generated from the first land client into a global message when the first land client requests a communication with a vessel client and providing the vessel client with the global message via the vessel maintenance service unit on land; receiving a message generated from the vessel client via the vessel maintenance service unit and the unified vessel maintenance service unit; and converting the received message into a local message and providing the first land client with the local message.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 1:
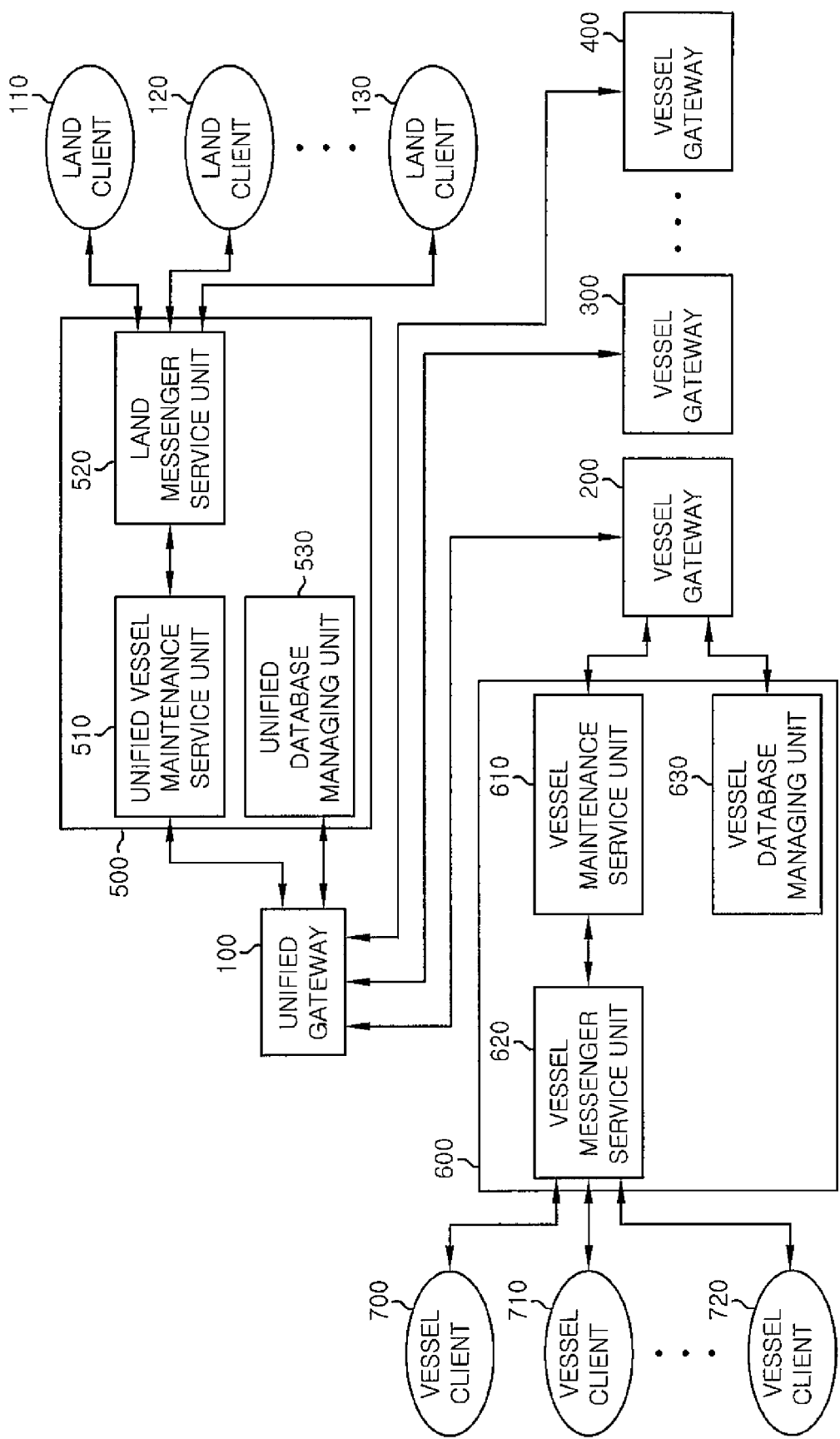
FIG. 1 is a block diagram of a remote vessel maintenance system including messenger service apparatuses in accordance with the embodiment of the present invention.

Embodiments of the present invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Combinations of respective blocks of block diagrams attached herein and respective steps of a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram. Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective steps of the sequence diagram.

Moreover, the respective blocks or the respective steps may indicate modules, segments, or some of codes including at least one executable instruction for executing a specific logical function(s). In several alternative embodiments, it is noticed that functions described in the blocks or the steps may run out of order. For example, two successive blocks and steps may be substantially executed simultaneously or often in reverse order according to corresponding functions.

Hereinafter, embodiments of the present invention will be described with reference to the accompanying drawings which form a part hereof.

FIG. 1 is a block diagram of a remote vessel maintenance system including a land and a vessel messenger service apparatus in accordance with the embodiment of the present invention.

As shown in FIG. 1, the remote vessel maintenance system may include vessel gateways 200, 300 and 400 installed in each vessel and a unified gateway 100 for managing each vessel on land.

A land messenger service apparatus 500 connected to the unified gateway 100 of the remote vessel maintenance system may include a unified vessel maintenance service unit 510 for performing the maintenance service of the land, a land messenger service unit 520 for providing messenger service and a unified database managing unit 530 or the like. The land messenger service apparatus 500 may perform the message service on the land while performing the maintenance service through the unified vessel maintenance service unit 510 of the land.

A vessel messenger service apparatus 600 is included in a vessel. The vessel maintenance apparatus 600 may include a vessel maintenance service unit 610 for performing the maintenance of the vessel, a vessel messenger service unit 620 for providing a messenger service in the vessel and a vessel database managing unit 630 or the like. The vessel maintenance apparatus 600 may provide the message service in the vessel while performing the maintenance service relating to the vessel through the vessel maintenance service unit 610.

Maintenance service relating to a vessel performed by the unified vessel maintenance service unit 510 and the vessel maintenance service unit 610 may be implemented by middleware and service, and may be started by the middleware.

The unified database managing unit 530 and the vessel database managing 630 unit manage a database for managing the remote vessel maintenance system and a user database for providing a messenger service.

Land clients 110, 120 and 130 connected to the land messenger service apparatus 500 may log in to a web of the remote vessel maintenance system as a web client, install messenger service program in a user terminal, e.g., a personnel computer by clicking an icon on the web for downloading messenger service program and prepare a messenger client program.

In addition, vessel clients 700, 710 and 720 connected with vessel messenger service apparatus 600 may prepare a messenger client program by using the same method as the land clients 110, 120 and 130 when external network is usable. When local network is configured inside the vessel and a web server for the vessel is installed inside the vessel, the vessel clients 700, 710 and 720 can log on to a web via internal network of the vessel, download vessel messenger client program, and prepare the vessel messenger program by installing the vessel messenger program in a user terminal, e.g., a personnel computer.

The land messenger service unit 520 may separately manage database relating all users in the remote vessel maintenance system for messenger service.

In addition, when the vessel maintenance service unit 610 is connected to the unified vessel maintenance service unit 510, the vessel maintenance service unit 610 may download user information relating to a vessel, e.g., the information of a sailor and a manager on land from the unified vessel maintenance service unit 510.

The vessel messenger service unit 620 may separately manage user information relating to the vessel clients 700, 710 and 720 for messenger service and the land messenger service unit 520 may separately manage user information relating to the land clients 110, 120 and 130 for messenger service. Database which is managed in the vessel messenger service unit 620 or the land messenger service unit 520 may be shared with the unified vessel maintenance service unit 510.

Since the vessel messenger service unit 620 and the land messenger service unit 520 manage separately user information for messenger service, a problem that the messenger service is terminated when the implementation of the middleware is terminated suddenly or normally can be solved and thus, the messenger service can be supported continuously.

Namely, since the vessel messenger service unit 620 manages separately user information relating to a vessel, communication may be supported in emergency situation where a unified vessel maintenance service system is terminated.

The messenger service unit 620 of the vessel messenger service apparatus 600 in accordance with the embodiment of the present invention may provide messenger service between the vessel clients 700, 710 and 720 by using a local message generated from the vessel clients 700, 710 and 720. As described above, the vessel messenger service unit 620 manages separately user information relating to a vessel.

Meanwhile, the vessel messenger service unit 620 can convert a local message generated from the vessel clients 700, 710 and 720 into a global message and provide the unified vessel maintenance service unit 510 through the vessel maintenance service unit 610 with the global message, or the vessel messenger service unit 620 can convert a global message transmitted from the unified vessel maintenance service unit 510 through the vessel maintenance service unit 610 into a local message.

The vessel maintenance service unit 610 can provide a remote vessel maintenance service by interworking with unified vessel maintenance service unit 510 in the land messenger service apparatus 500 and provide a session for providing messenger service between the vessel clients 700, 710 and 720 and the land clients 110, 120 and 130.

Meanwhile, the vessel maintenance service unit 610 may have two state values of local mode and global mode. The local mode means that the vessel maintenance service unit operates without connection to the unified vessel maintenance service unit 510. The global mode means that the vessel maintenance service unit 610 is connected to the unified vessel maintenance service unit 510 and the remote monitoring and maintenance of a vessel can be performed on land.

Similarly, the vessel messenger service unit 620 can operate in local mode and global mode. When the vessel maintenance service unit 610 operates in local mode, the vessel messenger service unit 620 operates in local mode and the vessel messenger service unit 620 provides communication service only between the vessel clients 700, 710 and 720. In addition, when the vessel maintenance service unit operates in global mode, the vessel messenger service unit 620 operates in global mode and the vessel messenger service unit 620 can transmit message generated from the vessel clients 700, 710 and 720 to the land clients 110, 120 and 130 or transmit the message of the land clients 110, 120 and 130 to the vessel clients 700, 710 and 720. The message can be transmitted to the land clients 110, 120 and 130 via the vessel maintenance service unit 610, the unified vessel maintenance unit 510 and the land messenger service unit 520 in turn.

Already connected session can be used as the session of the vessel messenger service unit 620 and the unified vessel messenger service unit 510 for remote vessel maintenance without opening separate session or can open separate session. For example, a session between the vessel messenger service unit 620 and the unified vessel maintenance service unit 510 can be used without opening separate session for the vessel messenger service unit 620.

Meanwhile, when the vessel messenger service unit 620 operates in global mode and the vessel clients 700, 710 and 720 wants messenger service between the vessel clients 700, 710 and 720 and the land clients 110, 120 and 130, local message generated from the vessel clients 700, 710 and 720 can be converted into global message and the global message can be transmitted to the vessel maintenance service unit 610 and the unified vessel maintenance service unit 510 and global message transmitted from the unified vessel maintenance service unit 510 can be transmitted to the land messenger service unit 520.

In addition, the land messenger service unit 520 transmits the transmitted message to the land clients 110, 120 and 130. The land messenger service unit 520 converts local message transmitted from the land clients 110, 120 and 130 into global message and the global message is transmitted to the vessel messenger service unit 620 via the unified vessel maintenance service unit 510 and the vessel maintenance service unit 610 and the vessel messenger service unit 620 can transmit the message to the corresponding vessel client 700, 710 and 720. Namely, a message which should be transmitted in global mode from a vessel to land is converted from local message into global message in the vessel messenger service unit 620 and a message which should be transmitted from land to a vessel is converted from local message of land to global message in the land messenger service unit 520, the message is transmitted to the vessel maintenance service unit 610 and the unified vessel maintenance service unit 510 and the message is relayed to the corresponding place.

Meanwhile, the vessel messenger service unit 620 and the land messenger service unit 520 can provide a buddy list according to user level, namely, buddy list which is constructed differently according to the user level can be provided to the vessel clients 700, 710 and 720 and the land clients 110, 120 and 130. For example, the owner of the vessel can be provided with his own buddy list which consists of employees of company which a vessel belongs to, a system manufacturer delivering a system to the vessel, the sailors of the vessel and all persons relating to the vessel from the vessel messenger service unit 620 or the land messenger service unit 520. Meanwhile, the sailor can be provided with his own buddy list which consists of his colleagues of a company which a vessel belongs to and the sailors of the vessel.

The vessel messenger service unit 620 may permit login of the vessel clients 700, 710 and 720 in local mode and provide buddy list relating to the vessel clients 700, 710 and 720 and service relating to messenger.

The vessel clients 700, 710 and 720 can log on by registering in the vessel messenger service unit 620 and the land clients 110, 120 and 130 can log on by registering in the land messenger service unit 520.

However, the land clients 110, 120 and 130 can use messenger service when they get on the vessel. The login process for this will be described with reference to FIG. 2.

Figure 2:
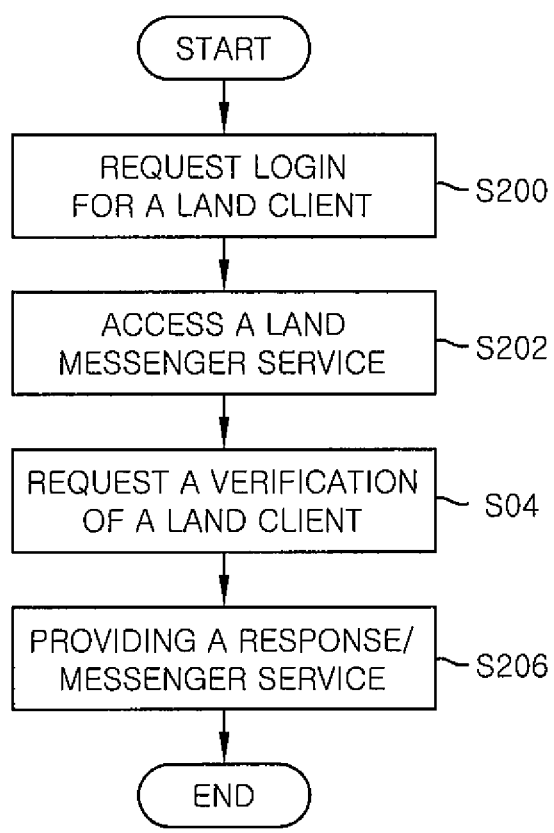
FIG. 2 is a flowchart explaining login process in which a land client logs on to a vessel messenger service in accordance with the embodiment of the present invention.

FIG. 2 is a flowchart explaining login process in which land client logs on to vessel messenger service.

As shown in FIG. 2, when the land clients 110, 120 and 130 log on the vessel messenger service unit 620 and request login in step 5200, the vessel messenger service unit 620 accesses the land messenger service unit 520 via the vessel maintenance service unit in step 5202. Then, vessel messenger service unit 620 requests user verification for the land clients since the vessel messenger service unit 620 includes user information for the land clients 110, 120 and 130 in local database and however, the vessel messenger service unit 620 does not include password information in the local database in step 5204. Namely, the vessel messenger service unit 620 generates global message by using user information which has been inputted by the land clients 110, 120 and 130 for login and transmits the global message to the vessel maintenance service unit 610 for the user verification. The vessel maintenance service unit 610 transmits the global message to the land message service unit via the unified vessel maintenance service unit 510.

The land messenger service unit 520 generates global message in order to provide the vessel messenger service unit 620 with a response to the user verification request of the land client and thereafter, transmits the global message to the vessel messenger service unit 620 via the unified vessel maintenance service unit 510 and the vessel maintenance service unit 610. Namely, the vessel messenger service unit 620 receives the response to the user verification request for the land clients 110, 120 and 130 from the land messenger service unit 520 and thereafter, can provide the messenger service to the land clients 110, 120 and 130 based on the response in step 5206.

Meanwhile, when the vessel clients 700, 710 and 720 access the vessel messenger service unit 620 and perform login for land messenger service, there does not exist problem. This is because the land messenger service unit 520 manages information on both the land clients 110, 120 and 130 and vessel clients 700, 710 and 720 in order to support the unified vessel maintenance service unit 510.

In case of cross login, i.e., in case that the land clients 110, 120 and 130 getting on the vessel use messenger service or the vessel clients 700, 710 and 720 working on land use messenger service, the management of additional information about where client logs on currently is required. Thus, the vessel messenger service unit 620 and the land messenger service unit 520 can manage location information for client when the client logs on.

A client addition and deletion function is provided for using the remote vessel maintenance system and client account and password which is used in the remote vessel maintenance system is used in the vessel messenger service unit 620 and the land messenger service unit 520. Namely, the vessel messenger service unit 620 and the land messenger service unit 520 can add or delete client when the client is added or deleted in the remote vessel maintenance system.

The addition and deletion of client can be performed through the web server of the remote vessel maintenance system. In case of the land client, information for name, account, password, the level of employee working on land and company and the like can be added. In case of the vessel client, information for the name of sailor, account, password, position, vessel and company or the like can be added.

Meanwhile, in case that client is added during messenger service, the client is added on the relating buddy list as off-line and when the client logs on, the stat of the client is changed to be online. In case that a client is deleted between clients registered as online, the client is deleted from the buddy list of a client and chatting window can be deactivated or closed automatically. By this, error can be prevented in the messenger service.

When the unified vessel maintenance service unit 510 is normally or abnormally terminated during the messenger service operating in global mode, the vessel maintenance service unit 510 is converted into local mode and the vessel messenger service unit 620 can be converted into local mode. By this, error can be prevented in the messenger service.

When the mode is changed to local mode, the state of the land clients 110, 120 and 130 on buddy list which is provided to the vessel clients 700, 710 and 720, is changed to be offline and chatting window can be deactivated or closed. By this, error can be prevented in the messenger service.

Meanwhile, information for the vessel clients 700, 710, and 720 and the land clients 110, 120 and 130 can be managed by the vessel database managing unit 630 and the unified database managing unit 530. Namely, information for the vessel clients 700, 710 and 720 who access messenger service in the vessel can be managed by the vessel database managing unit 630 and information for the land clients 110, 120 and 130 who access messenger service on land can be managed by the unified database managing unit 530.

The vessel messenger service unit 620 and the land messenger service unit 520 can share database with the vessel maintenance service unit 610 and the unified vessel maintenance service unit 510 or can manage database separately from the vessel maintenance service unit 610 and the unified vessel maintenance service unit 510. In addition, they can convert local message into global message and can convert global message into local message. Furthermore, they can perform client management function of the messenger service and the client management function can be implemented by server.

As described above, the messenger service according to the embodiment of the present invention is registered as separate service from the vessel maintenance service, and in this case, database management can be performed by the vessel maintenance service. Namely, the vessel maintenance service can determine communication request with land and convert local message into global message or determine message from land and convert global message into local message. In addition, the client management of the messenger service can be directly performed by the vessel maintenance service.

According to the embodiments of the present invention, before the vessel maintenance service is connected to the unified vessel maintenance service, messenger provides local service and when the vessel maintenance service is connected to the unified vessel maintenance service and the vessel maintenance service operates in global mode, messenger service is provided between users in the vessel and land. Thus, easy and efficient communication can be provided since instant communication between users of remote vessel apparatus maintenance system is possible.

While the invention has been shown and described with respect to the embodiments, it will be understood by those skilled in the art that various changes and modification may be made without departing from the scope of the invention as defined in the following claims.

What is claimed is:

1. A vessel messenger service apparatus providing a vessel maintenance service for a vessel, comprising:
   a vessel maintenance service unit for providing
      a messenger service between vessel clients and a land client in real time, and
      a remote vessel maintenance service by interworking with a unified vessel maintenance service unit on land so that maintenance of the vessel is performed by the unified vessel maintenance service unit;
a vessel messenger service unit for
managing location information of clients by performing a login process; and
providing messenger service between the vessel clients by using a local message generated from the vessel clients,
converting the local message into a global message to be provided to the land client via the messenger service between the vessel clients and the land client performed by the vessel maintenance service unit, converting a message generated from the land client into a converted local message and providing the converted local message to the vessel clients; and
a vessel database managing unit for managing information for the vessel clients and the land client.

2. The apparatus of claim 1, wherein the vessel maintenance service unit is switchable between a local mode and a global mode, and
in the local mode, the vessel messenger service unit provides
a communication only between the vessel clients, the vessel clients all being connected to a local network of the vessel, and
in the global mode, the vessel messenger service unit provides a communication both
between the vessel clients, and
between the vessel clients and the land client.

3. The apparatus of claim 1, wherein the vessel maintenance service unit provides the messenger service between the vessel clients and the land client
by using a session for the remote vessel maintenance service, or
by using a session different from the session for the remote vessel maintenance service.

4. The apparatus of claim 1, wherein the vessel database managing unit manages a database where level information of the vessel clients and the land client is set, and
wherein the vessel messenger service unit constructs a buddy list by using the level information and provides at least one of the vessel clients with the buddy list.

5. The apparatus of claim 1, wherein when the land client accesses the messenger service between the vessel clients and the land client, the vessel messenger service unit requests user verification based on user information inputted by the land client for a login at the unified vessel maintenance service unit via the vessel maintenance service unit, and provides the messenger service between the vessel clients and the land client based on a response to the user verification request.

6. The apparatus of claim 1, wherein the vessel messenger service unit extracts location information of the vessel clients, which access the messenger services, and manages the location information through the vessel database managing unit by registering the location information in a database.

7. The apparatus of claim 1, wherein the vessel messenger service unit constructs a buddy list based on a database managed by the vessel database managing unit and provides the buddy list to the vessel clients.

8. The apparatus of claim 7, wherein the vessel messenger service unit provide a friend addition and deletion function in the buddy list.

9. The apparatus of claim 1, wherein when an operation of the vessel maintenance service unit or the unified vessel maintenance service unit is terminated normally or abnormally, the vessel messenger service unit deactivates the land client in a buddy list having the vessel clients and the land client.

10. A land messenger service apparatus providing a vessel maintenance service for a vessel, comprising:
a unified vessel maintenance service unit on land and for providing
messenger service between a vessel client and land clients in real time, and
a remote vessel maintenance service by interworking with a vessel maintenance service unit to perform maintenance on the vessel;
a land messenger service unit for
providing a messenger service between the land clients by using a local message generated from the land clients,
converting the local message generated from the land clients into a global message to be provided to the vessel client via the messenger service between the vessel client and the land clients provided by the unified vessel maintenance service unit,
converting a message generated from the vessel client into a converted local message and providing the converted local message to the land clients; and
a unified database managing unit for managing information for the vessel client and the land clients.

11. The apparatus of claim 10, wherein the unified vessel maintenance service unit is switchable between a local mode and a global mode,
in the local mode, the land messenger service unit provides a communication only between the land clients, and
in the global mode, the land messenger service unit provides a communication both
between the land clients, and
between the vessel client and the land clients.

12. The apparatus of claim 10, wherein the unified vessel maintenance service unit provides the messenger service between the vessel client and the land clients
by using a session for the remote vessel maintenance service, or
by using a session different from the session for the remote vessel maintenance service.

13. The apparatus of claim 10, wherein the unified database managing unit manages a database where level information of the vessel client and the land clients is set, and
wherein the land messenger service unit constructs a buddy list by using the level information and provides the at least one of the land clients with the buddy list.

14. The apparatus of claim 10, wherein the land messenger service unit extracts location information of the land clients which access the messenger services and manages the location information through the unified database managing unit by registering the location information in a database.

15. The apparatus of claim 10, wherein the land messenger service unit constructs a buddy list based on a database managed by the unified database managing unit and provides the buddy list to the land clients.

16. The apparatus of claim 15, wherein the land messenger service unit provide a friend addition and deletion function in the buddy list.

17. The apparatus of claim 10, wherein when an operation of the unified vessel maintenance service unit or the vessel maintenance service unit is terminated normally or abnormally, the land messenger service unit deactivates the vessel client in a buddy list having the vessel client and the land clients.

18. A method for providing a messenger service by using a vessel maintenance service unit of a vessel interworking with a unified vessel maintenance service unit on land via a unified gateway, comprising:

performing a login process for a first vessel client on the vessel when a messenger service request is received from the first vessel client;

providing a messenger service between the first vessel client and a second vessel client;

converting a message generated from the first vessel client into a global message when the first vessel client requests a communication with a land client;

providing the land client with the global message via the unified vessel maintenance service unit;

receiving a land message generated from the land client via the unified vessel maintenance service unit and the vessel maintenance service unit;

converting the received land message into a local message and providing the first vessel client with the local message; and performing with the unified vessel maintenance service unit, a remote vessel maintenance service by interworking with the vessel maintenance service unit to perform maintenance on the vessel.

19. The method of claim 18, wherein the performing the login process includes:

providing a buddy list based on information of the first client.

20. A method for providing a messenger service by using a unified vessel maintenance service unit on land interworking with a vessel maintenance service unit of a vessel via a unified gateway, comprising:

performing a login process for a first land client when a messenger service request is received from the first land client;

providing a messenger service between the first land client and a second land client;

converting a message generated from the first land client into a global message when the first land client requests a communication with a vessel client providing the vessel client with the global message via the unified vessel maintenance service unit on land;

receiving a vessel message generated from the vessel client via the vessel maintenance service unit and the unified vessel maintenance service unit;

converting the received vessel message into a local message and providing the first land client with the local message; and performing with the unified vessel maintenance service unit, a remote vessel maintenance service by interworking with the vessel maintenance service unit to perform maintenance on the vessel.

* * * * *